United States Patent
Sabapathi et al.

(10) Patent No.: US 12,510,313 B1
(45) Date of Patent: Dec. 30, 2025

(54) METHOD OF CLEANING A COLD BOX

(71) Applicant: KUWAIT NATIONAL PETROLEUM COMPANY, Safat (KW)

(72) Inventors: Kanagasabai Sabapathi, Ahmadi (KW); Saleh N.S.E. Aljateli, Kuwait (KW); Abdulrahman Al Sumaie, Kuwait (KW)

(73) Assignee: KUWAIT NATIONAL PETROLEUM COMPANY, Safat (KW)

( * ) Notice: Subject to any disclaimer, the term of this patent is extended or adjusted under 35 U.S.C. 154(b) by 0 days.

(21) Appl. No.: 19/277,913

(22) Filed: Jul. 23, 2025

(51) Int. Cl.
*F28G 9/00* (2006.01)
*F28G 15/00* (2006.01)

(52) U.S. Cl.
CPC .......... *F28G 9/00* (2013.01); *F28G 2015/006* (2013.01)

(58) Field of Classification Search
CPC .............................. F28G 9/00; F28G 2015/006
See application file for complete search history.

(56) References Cited

U.S. PATENT DOCUMENTS

| | | | | |
|---|---|---|---|---|
| 4,191,588 A | * | 3/1980 | Keyworth | F28G 9/00 134/2 |
| 4,250,150 A | * | 2/1981 | Karwat | C10K 1/16 423/246 |
| 4,764,219 A | * | 8/1988 | Yan | C09K 3/32 134/2 |
| 7,682,460 B2 | * | 3/2010 | Ferrara | B08B 9/0325 134/40 |

(Continued)

FOREIGN PATENT DOCUMENTS

| | | |
|---|---|---|
| CN | 1277627 C | 10/2006 |
| CN | 106989633 B | 6/2021 |
| KR | 10-2021-0061074 A | 5/2021 |

OTHER PUBLICATIONS

H. Müller-Steinhagen, M. R. Malayeri & A. P. Watkinson (2011) Heat Exchanger Fouling: Mitigation and Cleaning Strategies, Heat Transfer Engineering, 32:3-4, 189-196.

(Continued)

*Primary Examiner* — Erin F Bergner (74) *Attorney, Agent, or Firm* — Nath, Goldberg & Meyer; Joshua B. Goldberg (57) ABSTRACT

A method of cleaning a cold box of an exchanger includes performing a methanol pre-flush of the system and inspecting filters in a filtration unit. The method includes adding toluene reformate to circulation tank and circulating the toluene reformate. The method includes analyzing the circulating toluene reformate for sulfur content. The method includes starting a circulating pump and resuming circulation in a bottom to top flow. The method includes reversing circulation flow path to a top to bottom flow. The method includes returning the circulation flow path to the bottom to top flow and circulating the toluene reformate. The method includes starting the circulation pump and resuming circulation of the toluene reformate in the bottom to top flow path until sulfur levels are stable. The method includes emptying the toluene reformate from the system and flushing the system. The method includes performing a methanol post wash and dedusting the system.

18 Claims, 6 Drawing Sheets

(56) References Cited

U.S. PATENT DOCUMENTS

2009/0183431 A1* 7/2009 Smit .................. C01B 3/36
48/197 R

OTHER PUBLICATIONS

S. Jafarinejad. Control and treatment of sulfur compounds specially sulfur oxides (SOx) emissions from the petroleum industry: A review. Chemistry International 2(4) (2016) 242-253.
B. Otzisk, et al. "Chemical Cleaning and Decontamination of Refinery and Petrochemical Distillation Equipment"; Dublin, Ireland (2015).
B. Otzisk: "Chemical Cleaning and Degassing Refinery Equipment"; EPTQ (2008).

* cited by examiner

METHOD OF CLEANING A COLD BOX

BACKGROUND

Field

The disclosure of the present patent application relates to a method of cleaning a cold box in a heat exchanger, more specifically, the method relates to cleaning sulfur deposits in the cold box.

Description of Related Art

Cryogenic plants play a vital role in the production and processing of gases at extremely low temperatures, such as liquefied natural gas (LNG), liquid oxygen (LOX), and liquid nitrogen (LIN). At the heart of these facilities lies a crucial component known as the "cold box."

A cold box is a specialized enclosure that houses key cryogenic equipment, such as heat exchangers, distillation columns, and other components necessary for the liquefaction and separation of gases. Its primary purpose is to maintain low temperatures while minimizing heat transfer from the external environment, ensuring optimal performance of the cryogenic processes.

The sulfur content in a cold box exchanger can vary based on the specific application and materials used throughout the production process. In some cases, cold boxes can be designed to handle lower sulfur crude gases, which may require modifications to amine/sulfur recovery units to manage hydrogen sulfide ($H_2S$) levels. Any hydrogen sulfide not recovered on the above can in turn lead to the undesirable generation of elemental Sulphur. The presence of elemental sulfur in cold box components can lead to blockage issues. As such, the introduction of sulfur containing materials into the process provides the potential for sulfur-related challenges in these systems.

Even further, sulfur deposits cannot be cleaned with typical solutions such as citric acid and related chemicals with corrosion inhibitors.

Thus, an improved method for cleaning cold boxes that removes more sulfur is desired.

SUMMARY

The present disclosure relates generally to the removal of sulfur deposits. More specifically, a method of cleaning a cold box with reformate is disclosed. As described herein reformate is a premium blending of stocks for high-octane gasoline which result from catalytic reforming. The compositions of reformates vary widely, typically containing some mixture of $C_4$ to $C_{10}$ hydrocarbons, hydrogen, carbon dioxide, nitrogen, and various impurities, such as carbon monoxide, hydrogen sulfide ($H_2S$) and methanol.

In an embodiment, a method of cleaning a cold box of an exchanger as provided herein includes performing a methanol pre-flush of the cold box system and inspecting filters in a filtration unit included in the cold box system. The method also includes adding toluene reformate to a circulation tank and circulating the toluene reformate. The method may also include analyzing the circulating toluene reformate for sulfur content therein. The method may then include starting a circulating pump and resuming the circulation in a bottom to top flow path. Then the method may include reversing the circulation flow path to a top to bottom flow. The method may also include returning the circulation flow path to the bottom to top flow and circulating the toluene reformate. The method may then include starting the circulation pump and resuming the circulation of the toluene reformate in the bottom to top flow path until the sulfur levels are stable for two (2) hours. The method may then include emptying the toluene reformate from the system and flushing the system. The method may also include performing a methanol post wash and dedusting the system.

In an embodiment, performing a methanol pre-flush may include attaching circulation equipment to one or more nozzles and installing filters in a filtration unit. The method may also include adding methanol from a storage container into a bottom connection of the exchanger and collecting returns of the methanol in a circulation tank from a top connection. The method may also include circulating the methanol and monitoring the temperature of the methanol in the circulation tank. The method may then include draining the methanol from the bottom connection back into the storage container; and verifying all methanol is recovered.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions, products, or systems are described as having, including, or comprising specific components, or where processes are described as having, including, or comprising specific process steps, it is contemplated that compositions, products, or systems of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

As used herein, "reformate" refers to a premium blend of stocks for high-octane gasoline which result from catalytic reforming. The following are the reformate important content for the cleaning of the Sulphur: Benzene (C6 Aromatic): 1~1.5% and Toluene (C7 Aromatic): 16~20%. It also contains about 70% aromatics which adsorb sulphur and 30% paraffin help to improve physical properties.

The present disclosure relates to a method of cleaning cold boxes to remove sulfur deposits using a reformate. Sulphur deposits cannot be cleaned with typical solutions such as citric acid and related chemicals with corrosion inhibitors. The present method includes a first-time reformate and toluene to successfully clean sulfur deposits from cold boxes. The presently described methods are able to restore performance of a cold box exchanger user in the production and processing of various gases to design level. Design level is defined herein as the level of performance observed when the cold box exchanger is new.

Figure 1:
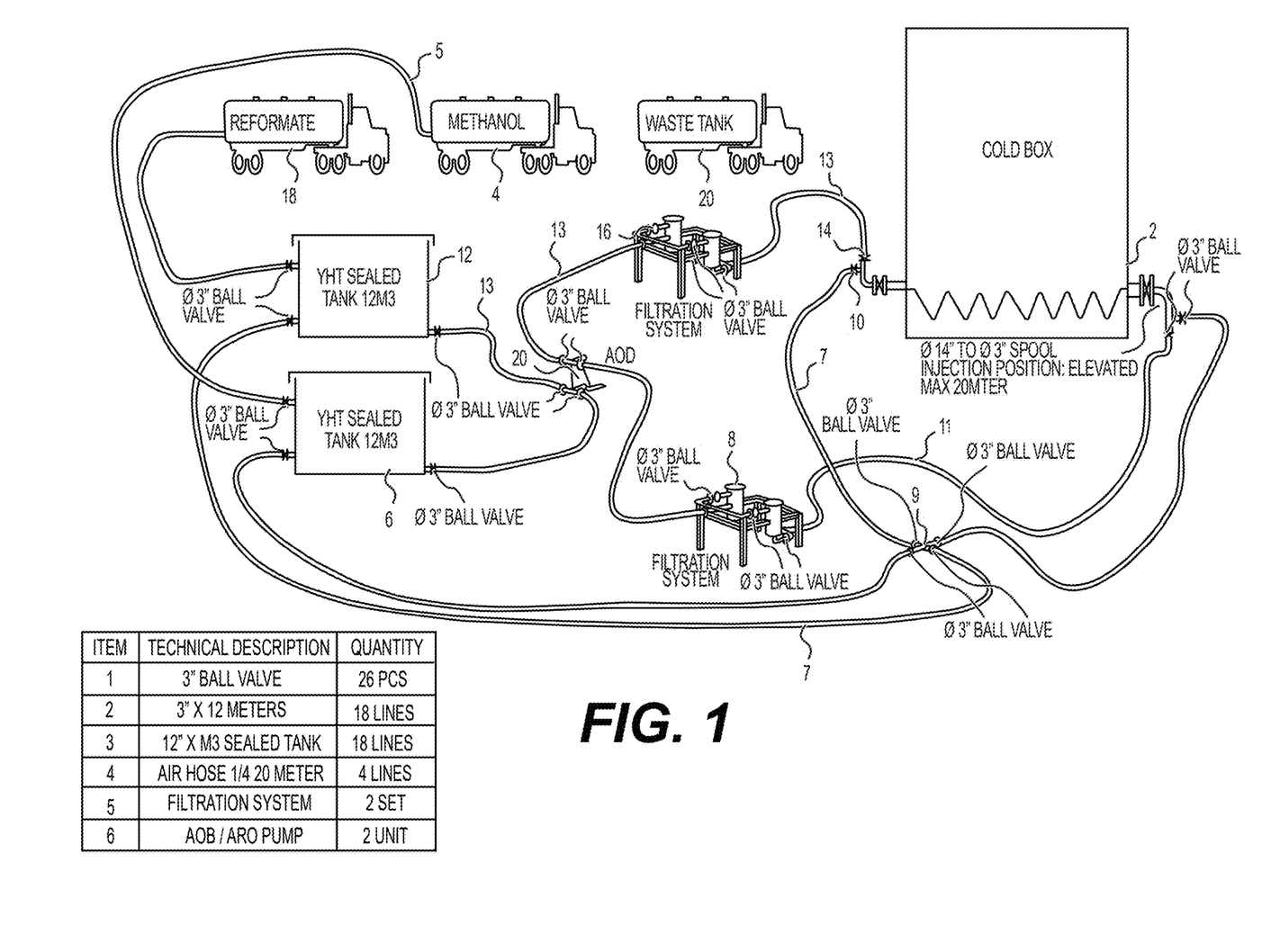
FIG. 1 shows a schematic of a system for cleaning a cold box including the cold box.

Referring to FIG. 1, an embodiment of the present method includes a method of cleaning a cold box 2 of an exchanger system, e.g., a heat exchanger system, also called a cold box system, where the method includes performing a methanol pre-flush of the cold box system. In various embodiments, the exchanger may be a brazed aluminum heat exchanger (BAHE). In an embodiment, the methanol pre-flush includes attaching a storage tank of methanol 4 to a first circulation tank 6 and attaching the first circulation tank to nozzles of the cold box. The first circulation tank 6 is coupled to the cold box through tubing 7. Tubing 5 connects the first circulation tank 6 to the methanol tank 4 and tubing 7 connects the first circulation tank 6 to the cold box 2. In various embodiments, the tubing is connected through ball valves 9. The methanol pre-flush may also include installing filters in a first filtration unit 8. The first filtration unit 8 is connected to the cold box through tubing 11. The methanol pre-flush may then include adding methanol from the storage container 4 into a bottom connection 10 of the cold box 2. The methanol flush may then include collecting returns of the methanol in a second circulation tank 12 from a top connection 14. The second circulation tank 12 is connected to the cold box 2 through tubing 13. The second filtration unit 16 is coupled between the top connection 14 of the cold box 2 and the second circulation tank 12 through tubing 13. The tubing 13 connects the top connection 14 of the cold box 2 to a second filtration unit 16. Additional tubing connects the second filtration 16 unit to the second circulation tank 12.

The methanol pre-flush may also include circulating the methanol and monitoring the temperature of the methanol in the second circulation tank 12. In various embodiments, circulating the methanol lasts for at least about 30 minutes, at least 30 minutes, or about 30 minutes. In some embodiments, monitoring the temperature of the methanol includes verifying the temperature is above at least about 50° C., at least 50° C., or about 50° C. The methanol pre-flush may also include draining the methanol from the bottom connection 10 back into the storage container 4 and verifying all methanol is recovered.

The method of cleaning a cold box may further include inspecting filters in a first filtration unit 8. In various embodiments, the filters may be replaced if needed. The method may also include adding toluene reformate from a reformate tank 18 to a first circulation tank 6 and circulating the toluene reformate. In some embodiments, the toluene reformate may circulate for at least about 3 hours, at least 3 hours, or about 3 hours. In other embodiments, the method includes analyzing the sulfur content in the circulating toluene reformate every hour, or according to any other suitable recurring time period.

The method may then include analyzing the circulating toluene reformate for sulfur content. In various embodiments, the method may further include replacing the circulating toluene reformate with new toluene reformate when the sulfur content is greater than 2000 ppm. In some embodiments, the method may include circulating the toluene reformate until the sulfur level is maintained at a level less than 500 ppm.

The method may also include starting a circulating pump 20 and resuming the circulation in a bottom to top flow path. In various embodiments, when starting the circulating pump and resuming the circulation, the circulation continues for at least about one (1) hour, at least one hour, or about one hour, and includes analyzing the sulfur content every hour. Again, this repeated step can also be conducted according to any other suitable recurring time period.

The method also includes reversing the circulation flow path to a top to bottom flow. In some embodiments, when reversing the circulation flow path to the top to bottom flow, the flow continues for at least about 1 hour, at least one hour, or about one hour, and includes analyzing the sulfur content every hour. Again, this repeated step can also be conducted according to any other suitable recurring time period.

The method includes returning the circulation flow path to the bottom to top flow and circulating the toluene reformate. This flow path may continue for at least about two (2) hours, at least two hours, or about two hours and includes analyzing sulfur content every two (2) hours, or according to any other suitable recurring time periods.

The method then includes starting the circulation pump and resuming the circulation of the toluene reformate in the bottom to top flow path until the sulfur levels are stable for two (2) hours, at least two hours, or about two hours. In various embodiments, resuming circulation in the bottom to top flow continues for at least about two (2) hours, at least two hours, or about two hours. In some embodiments, the sulfur content is analyzed every hour, at least every hour, or about every hour. In various embodiments, the circulating may take at least about twenty-four (24) hours to at least about thirty-six (36) hours, at least 24 hours to at least 36 hours, about 24 hours to about 36 hours, 24 hours to 36 hours, or any variation thereof.

The method may also include emptying the toluene reformate from the system. In various embodiments, the toluene reformate may be emptied into a waste tank 20. In some embodiments, the waste tank may be a road tanker or a large truck having a tank for collecting and carrying liquid.

The method may then include flushing the system. In various embodiments, light naphtha also known as Kuwait Natural Gasoline (KNG) may be circulated through the system. The light naphtha may be added to the system and circulated for at least about one (1) hour. The light naphtha may be analyzed for density. If the density of the circulating light naphtha is greater than at least about 0.65, at least 0.65, or about 0.65, the method may include replacing the light naphtha with new light naphtha. The circulating of light naphtha may continue until the density of the light naphtha is maintained at least about 0.65, least 0.65, or about 0.65. The method may then include emptying the light naphtha. The light naphtha may be emptied into a waste tank 20.

The method may then include performing a methanol post wash. In various embodiments, the methanol post wash may include replacing filters into the filtration system. In various embodiments, the filters may be twenty-five 25-micron filters. The methanol post wash may also include adding methanol into the bottom connection 10 of the exchanger 2 and collecting returns into the circulation tank 12 from the top connection 14. In various embodiments, the methanol may be circulated for at least about thirty (30) minutes, least 30 minutes, or about 30 minutes. The method may further include draining the methanol from the bottom connection 10 into the waste tank 20. The methanol post flush may also include verifying that all methanol has drained from the system.

The method may also include dedusting the system. In various embodiments, dedusting may include applying a pressure of 4 bar forward until all liquid used for cleaning is removed. More particularly, the pressure of the system is increased to 4 bars of nitrogen. The pressure is then suddenly released by rupture disk to remove all the liquid inside the cold box.

In various embodiments, the method of cleaning a cold box may include restoring the exchanger to design level where design level is the condition of the cold box when new from the manufacturer.

The reformate may be made from naphtha. Naphtha is a hydrocarbon that may be reformed to get the reformate used in the process. In various embodiments, the reformate may include $iC_4$, $nC_4$, iC5, Nc5, C5 Naphthenes, C5 Olefins, C6 Naphthenes, C6 Iso-paraffins, C6 N Paraffins, C6 aromatics, C6 olefins, C7 naphthenes, C7 iso paraffins, C7 N paraffins, C7 olefins, C7 aromatics, C8 Naphthenes, C8 iso paraffins, C8 N paraffins, C8 olefins, C8 Aromatics, C9 Naphthenes, C9 iso paraffins, C9 N paraffins, C9 olefins, C9 Aromatics, C10 Naphthenes, C10 iso paraffins, C10 N paraffins, C10 olefins, C10 Aromatics, C11+ compounds.

The present methods and systems as described herein can be further understood by referring to the following Examples.

Example 1

Reformate Components

The reformate may be created by the treatment of Naphtha. An example of the components of both the Naphtha and the reformate are listed in Table 1 below.

TABLE 1

| Components of Naphtha and Reformate | | | | |
|---|---|---|---|---|
| | Unit | | | |
| | CCR-25 | | CCR-26 | |
| | STREAM | | | |
| | HY.NAPHTHA | REFORMATE | HY.NAPHTHA | REFORMATE |
| iC4 | NIL | 0.64 | NIL | 0.69 |
| nC4 | NIL | 0.89 | NIL | 0.66 |
| C4 olefins | NIL | NIL | NIL | NIL |
| iC5 | NIL | 2.98 | NIL | 3.09 |
| Nc5 | NIL | 1.59 | NIL | 1.90 |
| C5 Naphthenes | NIL | 0.06 | NIL | 0.05 |
| C5 Olefins | NIL | 0.05 | NIL | 0.04 |
| C6 Naphthenes | 0.76 | 0.24 | 1.37 | 0.12 |
| C6 Isoparaffins | NIL | 2.02 | 0.04 | 1.93 |
| C6 N paraffins | 0.02 | 0.83 | 0.63 | 0.73 |
| C6 aromatics | 0.03 | 1.52 | 0.11 | 1.20 |
| C6 olefins | NIL | 0.50 | NIL | 0.50 |
| C7 Naphthenes | 6.41 | 0.66 | 6.19 | 0.56 |
| C7 iso paraffins | 10.55 | 10.14 | 9.15 | 9.84 |
| C7 N paraffins | 11.48 | 3.61 | 11.66 | 3.09 |
| C7 olefins | NIL | 1.47 | NIL | 1.41 |
| C7 Aromatics | 2.36 | 13.57 | 2.38 | 15.79 |
| C8 Naphthenes | 5.82 | 0.41 | 5.83 | 0.28 |
| C8 iso paraffins | 11.25 | 4.04 | 11.30 | 2.85 |
| C8 N paraffins | 9.35 | 1.20 | 9.27 | 0.78 |
| C8 olefins | NIL | 0.07 | NIL | 0.05 |
| C8 Aromatics | 4.71 | 22.44 | 4.70 | 23.90 |
| C9 Naphthenes | 4.63 | 0.17 | 4.66 | 0.09 |
| C9 iso paraffins | 9.49 | 1.10 | 9.51 | 0.63 |
| C9 N paraffins | 7.12 | 0.40 | 7.17 | 0.24 |
| C9 olefins | 0.02 | 0.49 | 0.03 | 0.34 |
| C9 Aromatics | 3.73 | 24.69 | 3.76 | 25.22 |
| C10 Naphthenes | 1.29 | NIL | 1.30 | NIL |
| C10 iso paraffins | 4.41 | 0.06 | 4.42 | 0.01 |
| C10 N paraffins | 4.57 | 0.24 | 4.55 | 0.16 |
| C10 olefins | 0.01 | 0.16 | 0.02 | 0.09 |
| C10 Aromatics | NIL | 3.07 | NIL | 3.10 |
| C 11+ | 1.97 | 0.69 | 1.95 | 0.66 |
| Total | 99.98 | 100.00 | 100.00 | 100.00 |
| PARAFFINS (P) | 69.43 | 29.73 | 68.89 | 26.6 |
| OLEFINS (O) | 0.03 | 2.76 | 0.05 | 2.43 |
| NAPHTHENES (N) | 19.7 | 1.61 | 20.11 | 1.14 |
| AROMATICS (A) | 10.84 | 65.9 | 10.95 | 69.83 |
| BENZENE | 0.03 | 1.52 | 0.11 | 1.2 |
| CYCLOHEXANE | 0.75 | 0.13 | 0.93 | 0.1 |

Example 2

Reformate Components

Figure 2:
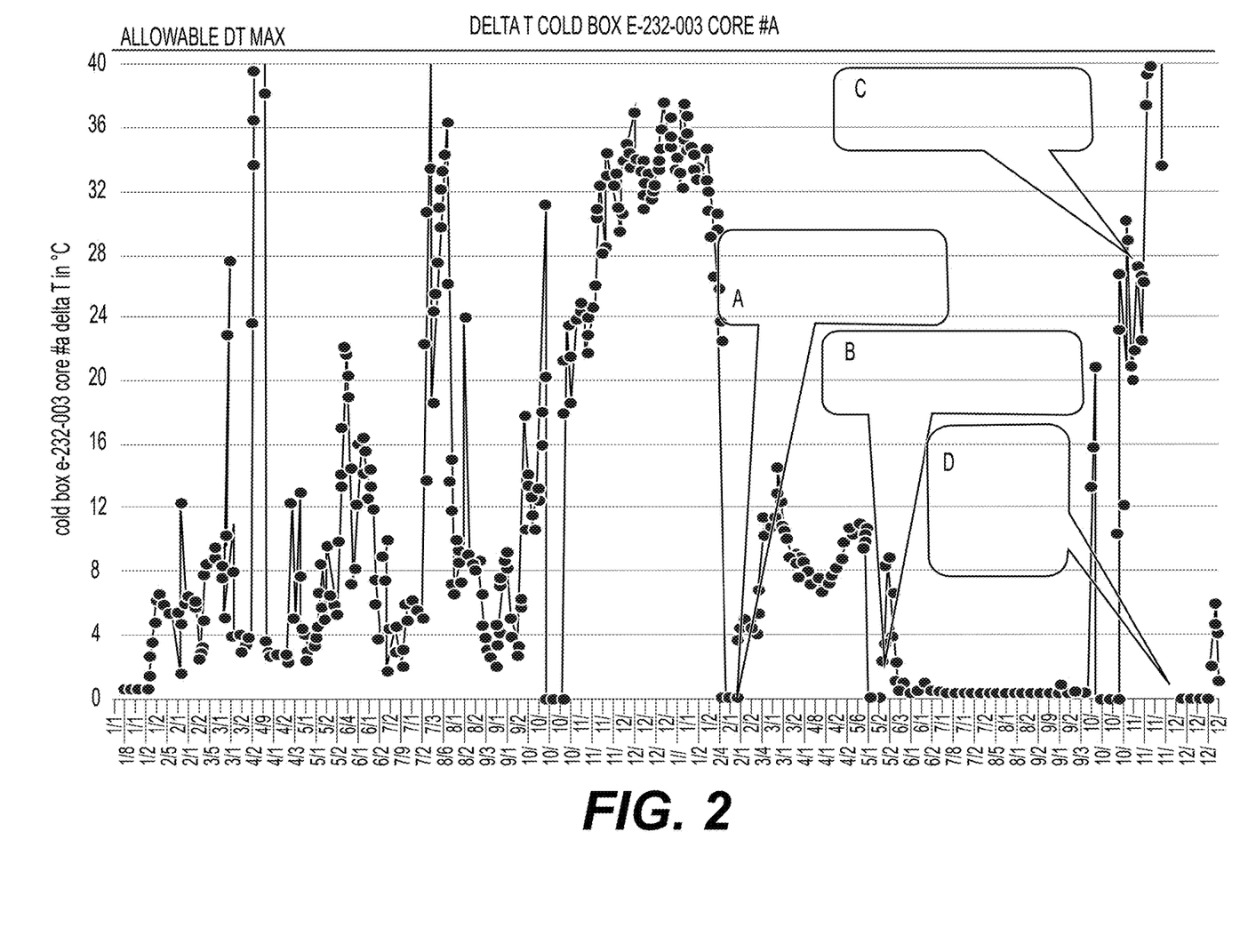
FIG. 2 is a graph showing changes in Temperature (Delta T) in a cold box (E-232-003) Core A after various stages and types of cleaning.

Referring to FIG. 2, a graph showing Delta T (change in temperature in degrees Celsius) in Core A of a cold box. At point A, Delta T was reduced after de-dusting in February 2023. Point B shows Delta T three months after a first cleaning with the Reformate. Point C shows an increased Delta T 5 months later after cleaning with citric acid. Point D shows a reduced Delta D after a second cleaning with the Reformate 2 months after the Citric Acid cleaning.

Figure 3:
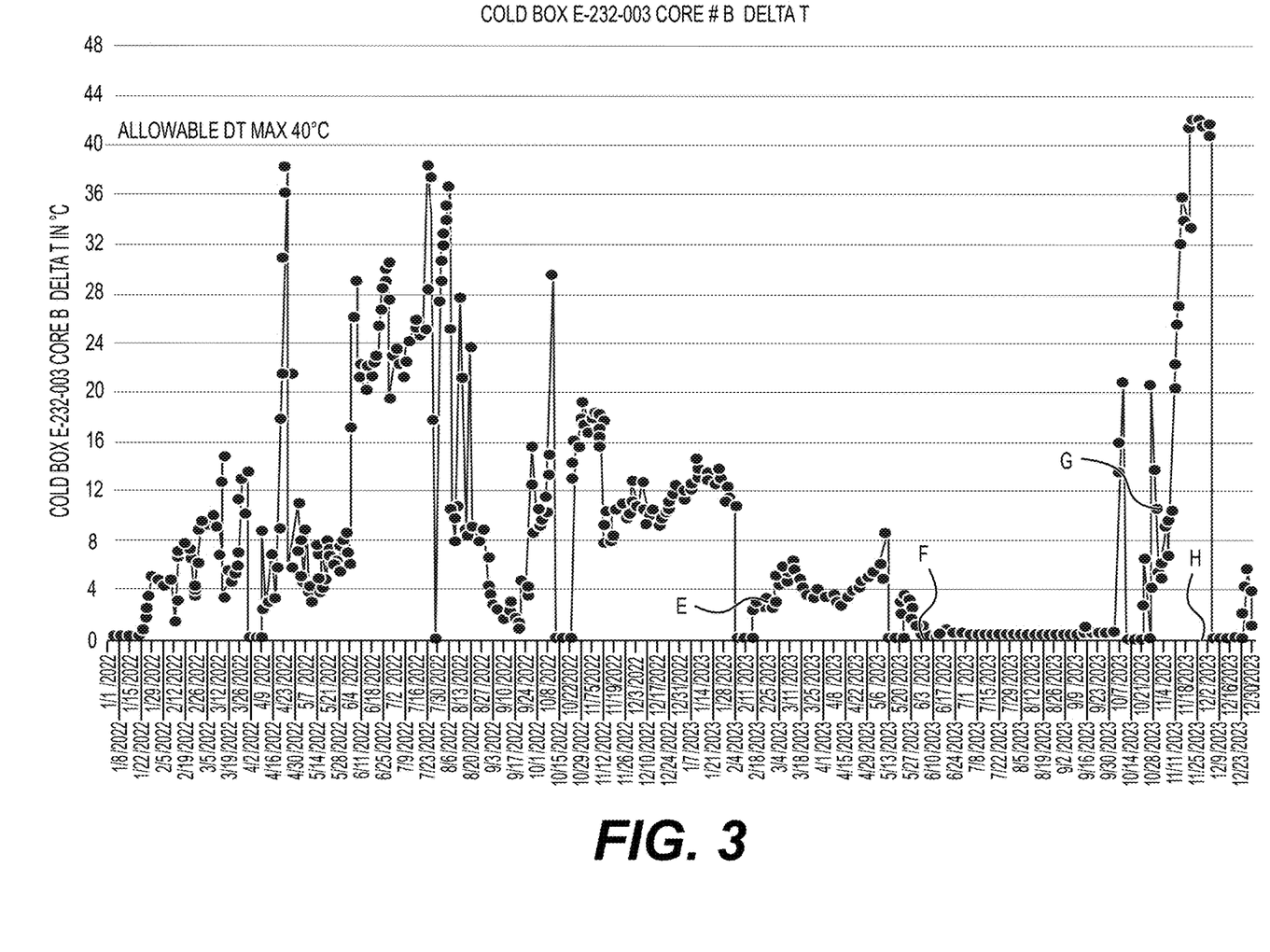
FIG. 3 is a graph showing changes in Temperature (Delta T) in a cold box (E-232-003) Core B after various stages and types of cleaning.

Similar results were achieved in Core B of the cold box as illustrated in FIG. 3. Referring to Point E, Delta T is shown after de-dusting. Point F shows Delta T after a first cleaning with Reformate. Point G shows an increased Delta T after cleaning with Citric Acid in October 2023 and Point H shows a decreased Delta T after a second cleaning with Reformate two months later in December 2023.

Figure 4:
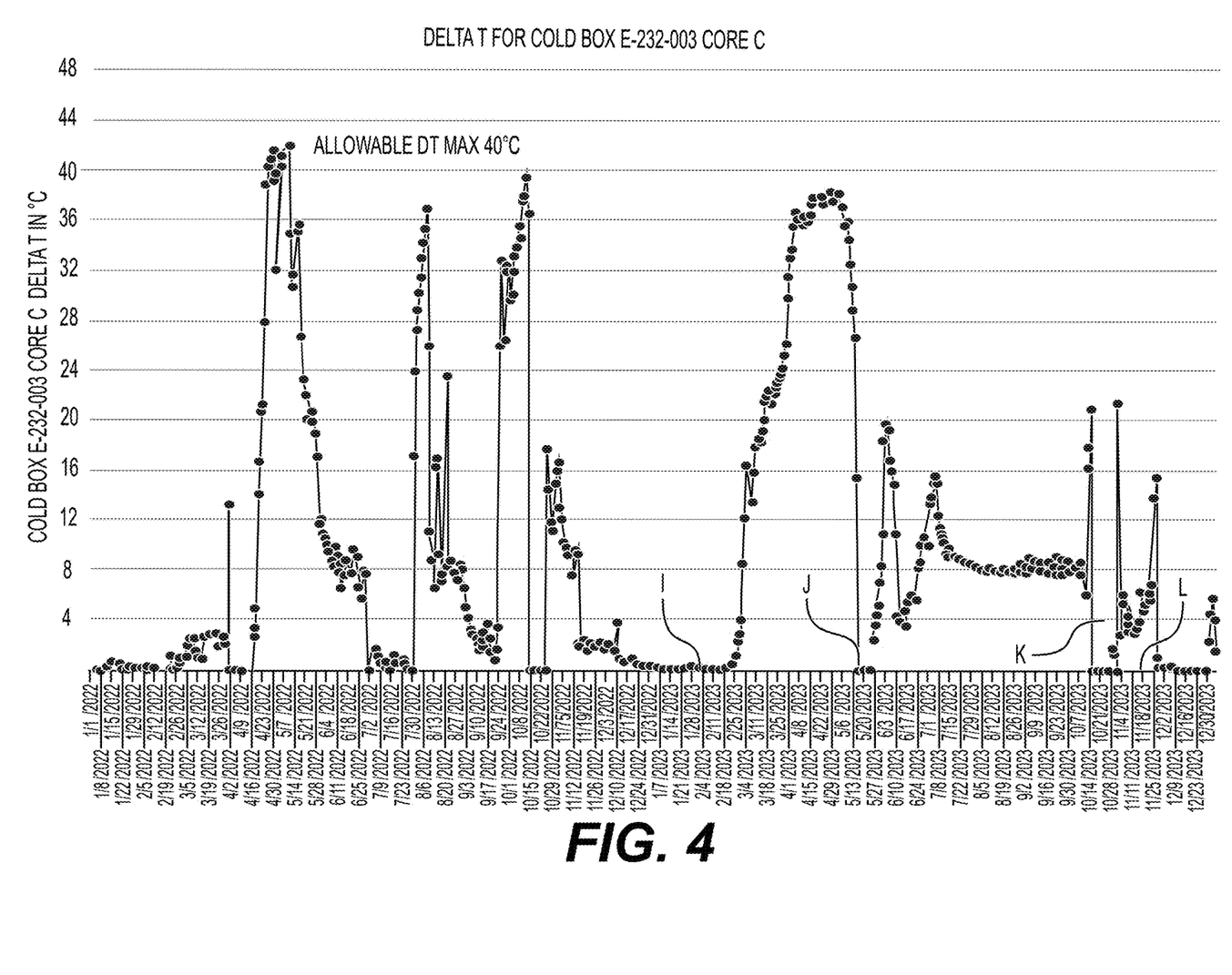
FIG. 4 is a graph showing changes in Temperature (Delta T) in a cold box (E-232-003) Core C after various stages and types of cleaning.

Referring to FIG. 4, results of cleaning with the Reformate as described herein is illustrated in Core C of the cold box. Point I shows a low point in Delta T before de-dusting. Point J shows delta T after a first reformate cleaning. Point K shows a slightly elevated Delta T after cleaning with Citric Acid and Point L shows a lowered Delta T after a second cleaning with the Reformate two months after the citric acid cleaning.

Figure 5:
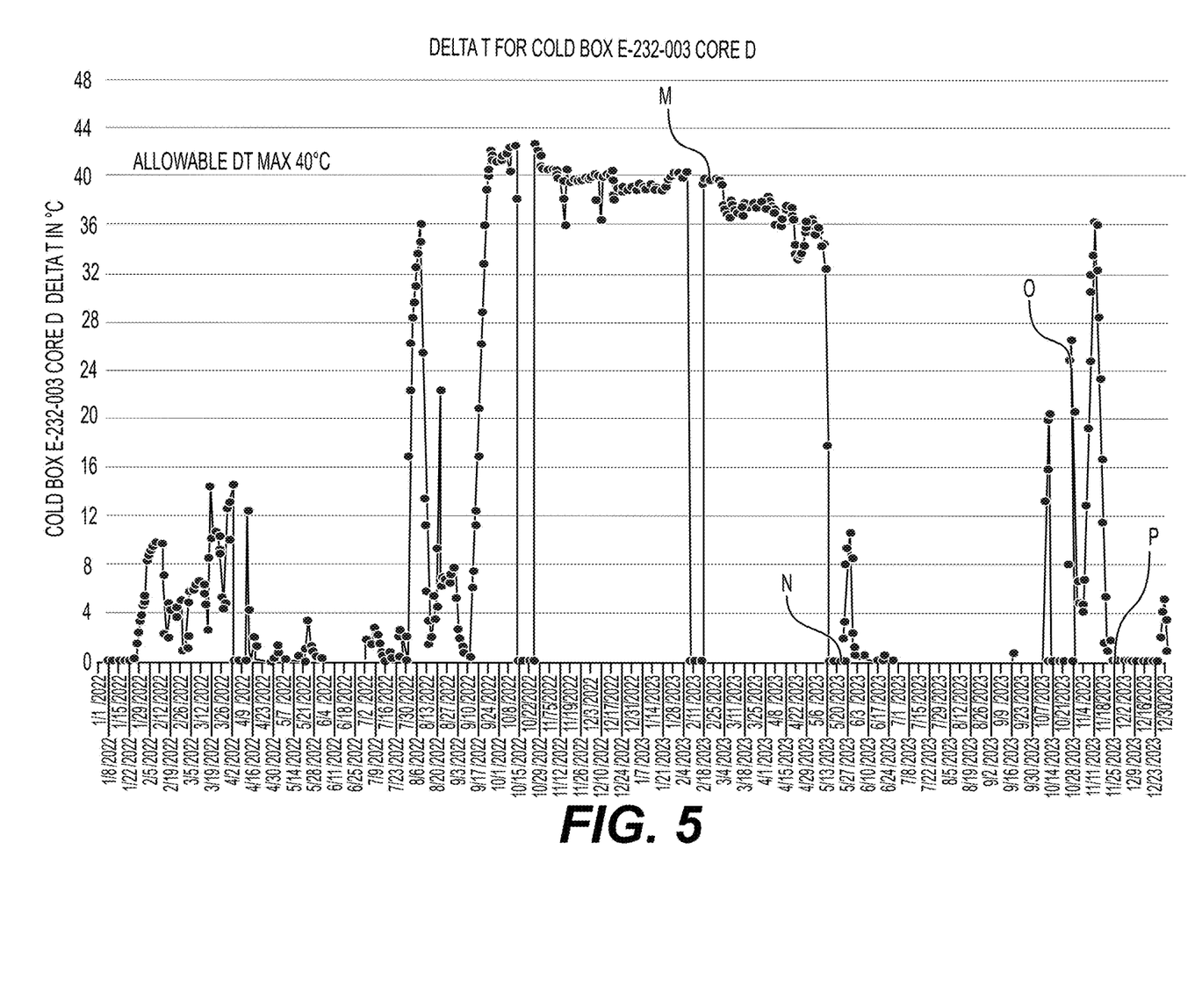
FIG. 5 is a graph showing changes in Temperature (Delta T) in a cold box (E-232-003) Core D after various stages and types of cleaning.

Referring to FIG. 5, results of cleaning with Reformate in Core D of the cold box are illustrated. Here, Point M shows a high delta T after de-dusting meaning that the de-dusting did not improve conditions in Core D. Point N shows a large change in Delta T after a first cleaning with the Reformate. Delta T again was elevated after cleaning with Citric Acid as illustrated with point O. Finally, Point P shows a lowered Delta T after a second cleaning with Reformate.

Figure 6:
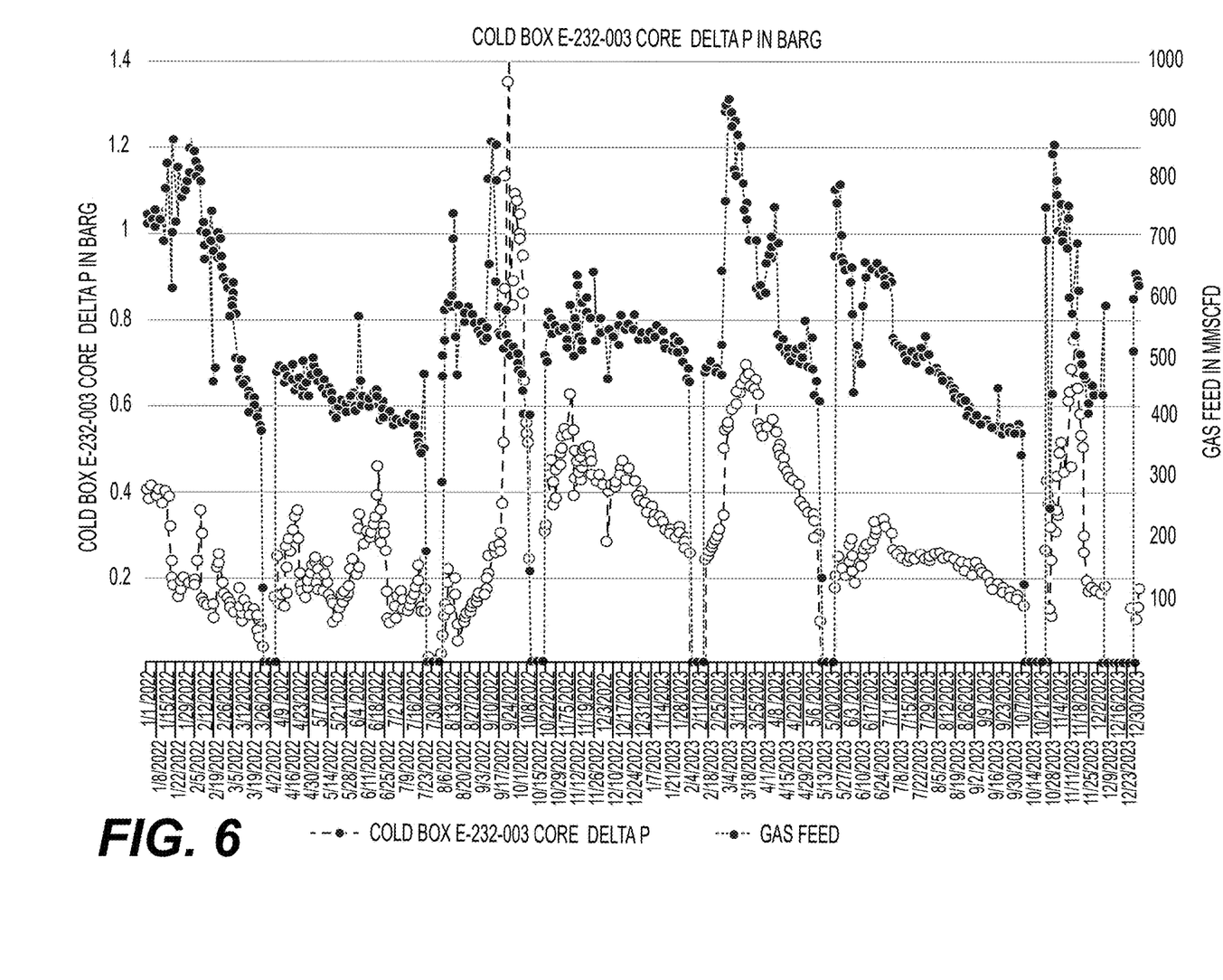
FIG. 6 is a graph showing changes in Pressure (in Barg) in a cold box (E-232-003) as compared with gas flow in the cold box.

FIG. 6 shows changes in Pressure (in the unit Barg) of the cold box in relation to the gas feed. The pressure is measured in Million Standard Cubic Feet per Day (MMSCFD) as noted on the right side of the graph.

It is to be understood that the method of cleaning a cold box using reformate is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of cleaning a cold box of an exchanger, the method comprising:
   performing a methanol pre-flush of a cold box system including
      filters in a first filtration unit;
   adding toluene reformate to a first circulation tank;
   circulating the toluene reformate through the cold box system, including:
      measuring sulfur levels in the circulating toluene reformate; and
      starting a circulating pump and resuming the circulation in a bottom to top flow path;
      reversing a circulation flow path of the toluene reformate to a top to bottom flow path, including:
      returning the circulation flow path of the toluene reformate to the bottom to top flow path and circulating the toluene reformate in the bottom to top flow path;
   starting the circulation pump and resuming the circulation of the toluene reformate in the bottom to top flow path until the sulfur levels are below a predetermined threshold for at least 2 hours;
   emptying the toluene reformate from the system;
   flushing the system;
   performing a methanol post wash; and
   dedusting the system.

2. The method of claim 1, wherein performing a methanol pre-flush comprises:
   attaching the first circulation tank to one or more nozzles;
   replacing the filters in the first filtration unit;
   adding the methanol from a storage container into a bottom connection of the exchanger and collecting returns of the methanol in a second circulation tank from a top connection;
   circulating the methanol and maintaining the temperature of the methanol in the circulation tank; and
   draining the methanol from the bottom connection back into the storage container until all methanol is recovered.

3. The method of claim 2, wherein circulating the methanol lasts for at least about 30 minutes.

4. The method of claim 2, wherein maintaining the temperature of the methanol comprises maintaining the temperature above 50° C.

5. The method of claim 1, the method further comprising replacing circulating toluene with new toluene when the sulfur content of the toluene reformate is greater than 2000 ppm.

6. The method of claim 1, the method further comprising circulating the toluene reformate until the sulfur level is maintained at a level less than 500 ppm.

7. The method of claim 1, wherein each time the circulating pump is restarted and circulation of the toluene reformate is restarted in the bottom to top flow path, circulation of the toluene reformate in the bottom to top flow path continues for at least about 1 hour and includes measuring the sulfur content every hour.

8. The method of claim 1, wherein reversing the circulation flow path to a top to bottom flow continues for at least about 1 hour and comprises measuring the sulfur content every hour.

9. The method of claim 1, wherein returning the circulation flow path to the bottom top flow and circulating the toluene reformate continues for at least about 2 hours and comprises measuring sulfur content every 2 hours.

10. The method of claim 1, wherein starting the circulation pump and resuming the circulation in the bottom to top flow continues for at least about 2 hours.

11. The method of claim 10, wherein the sulfur content is analyzed every hour.

12. The method of claim 10, wherein circulation continues for up to about 24 to 26 hours.

13. The method of claim 1, wherein flushing the system comprises adding light naphtha to the system and circulating the light naphtha for at least one hour, measuring the density of the light naphtha, continuing to circulate the light naphtha in the system until a density of the light naphtha is at or below at least 0.65, and removing the light naphtha I from the system.

14. The method of claim 1, wherein performing a methanol post wash comprises replacing filters into the first filtration system, adding methanol in to the bottom connection of the exchanger and collecting returns in the circulation tank from the top connection, circulating the methanol for at least about 30 minutes, reversing the flow path to the top bottom flow and circulating for at least about 30 minutes, and draining the methanol from the bottom connection into waste tank until all the methanol is drained from system.

15. The method of claim 14, wherein the filters are 25-micron filters.

16. The method of claim 1, wherein dedusting is performed at 4 bar forward until removal of all liquid.

17. The method of claim 1, further comprising restoring the exchanger to design level.

18. The method of claim 1, wherein the reformate is made from naphtha.

* * * * *